(12) United States Patent
Lospinoso et al.

(10) Patent No.: US 12,058,089 B2
(45) Date of Patent: Aug. 6, 2024

(54) SYSTEMS, METHODS, AND DATA STRUCTURES FOR SERIAL DATA COLLECTION AND COMPRESSION

(71) Applicant: Shift5, Inc., Rosslyn, VA (US)

(72) Inventors: Joshua Lospinoso, Falls Church, VA (US); Michael Weigand, Vienna, VA (US); James Correnti, Washington, DC (US)

(73) Assignee: SHIFT5, INC., Rosslyn, VA (US)

( * ) Notice: Subject to any disclaimer, the term of this patent is extended or adjusted under 35 U.S.C. 154(b) by 110 days.

(21) Appl. No.: 17/631,702

(22) PCT Filed: Jul. 31, 2020

(86) PCT No.: PCT/US2020/044642
§ 371 (c)(1),
(2) Date: Jan. 31, 2022

(87) PCT Pub. No.: WO2021/034489
PCT Pub. Date: Feb. 25, 2021

(65) Prior Publication Data
US 2022/0272060 A1    Aug. 25, 2022

Related U.S. Application Data

(60) Provisional application No. 62/881,748, filed on Aug. 1, 2019.

(51) Int. Cl.
*H04L 51/066* (2022.01)
*H04L 9/40* (2022.01)
*H04L 12/40* (2006.01)
*H04L 43/04* (2022.01)
*H04L 51/21* (2022.01)

(52) U.S. Cl.
CPC ............ *H04L 51/066* (2013.01); *H04L 12/40* (2013.01); *H04L 43/04* (2013.01); *H04L 51/21* (2022.05); *H04L 63/1408* (2013.01)

(58) Field of Classification Search
CPC ....... H04L 51/066; H04L 12/40; H04L 43/04; H04L 51/21; H04L 63/1408; H04L 51/212; H04L 43/028; H04L 51/18; H04L 67/12
USPC ......................................................... 709/206
See application file for complete search history.

(56) References Cited

U.S. PATENT DOCUMENTS

| | | |
|---|---|---|
| 8,578,269 B2 | 11/2013 | Osaka et al. |
| 8,819,538 B2 | 8/2014 | Underwood et al. |
| 9,697,262 B2 | 7/2017 | Chandramouli et al. |

(Continued)

FOREIGN PATENT DOCUMENTS

WO    2017/117259 A1    7/2017

OTHER PUBLICATIONS

Gao, High-Risk Series, "Urgent Actions Are Needed to Address Cybersecurity Challenges Facing the Nation", Highlights of GAO-18-622, Sep. 2018, Washington, D.C.

(Continued)

*Primary Examiner* — Tan Doan
(74) *Attorney, Agent, or Firm* — Myers Bigel, P.A.

(57) ABSTRACT

Methods, devices, systems, and data structures that relate to message formats are configured for compressing, storing, and/or transmitting messages collected from a serial bus in an operation technology (OT) environment.

8 Claims, 10 Drawing Sheets

(56) References Cited

U.S. PATENT DOCUMENTS

| 10,630,768 B1* | 4/2020 | Enigma | H04L 65/612 |
| 2017/0187621 A1* | 6/2017 | Shalev | H04L 45/745 |

OTHER PUBLICATIONS

International Search Report of PCT/US2020/044642 dated Mar. 30, 2021 [PCT/ISA/210].

Written Opinion of PCT/US2020/044642 dated Mar. 30, 2021 [PCT/ISA/237].

* cited by examiner

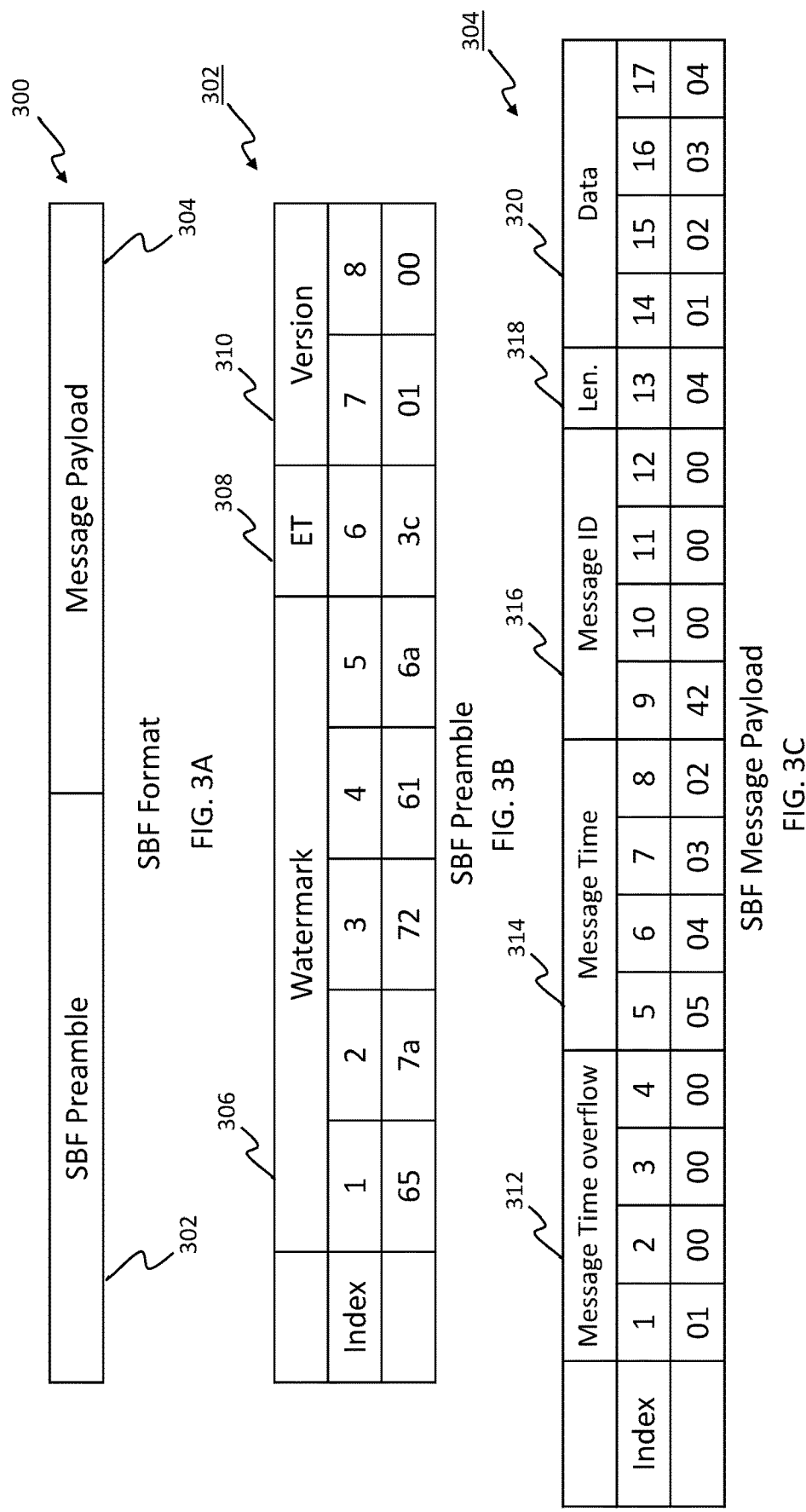

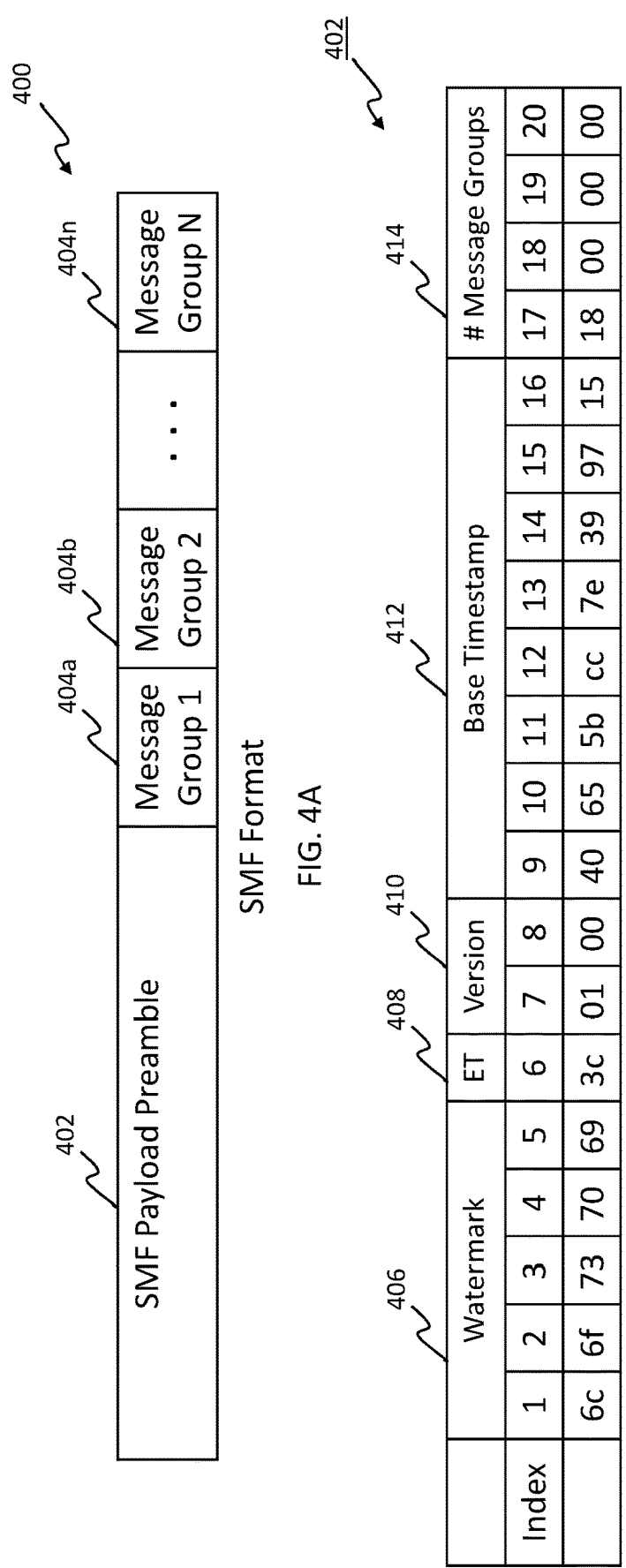

FIG. 4E — SMF Explicit Layout (418a)

| Index | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| | 02 | 00 | 00 | 00 | c1 | 2a | 00 | 00 | 1b | 00 | 00 | 00 | 9e | 67 | 00 | 00 | 2a | 06 | 05 | 04 |
| | # of entries (420) | | Preamble | | Time delta 1 (422a) | | Entry 1 — Data 1 (424a) | | | | | | Time delta 2 (422b) | | | Entry 2 — Data 2 (424b) | | | | |

FIG. 4F — SMF Data-Coalesced Layout (418b)

| Index | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| | 03 | 00 | 00 | 00 | 01 | 02 | 00 | 03 | cb | 01 | 00 | 00 | aa | 00 | 01 | 00 | 0d | 0c | 0b | 0a |
| | # of entries (426) | | Preamble | | Data (428) | | | | | | | | Time Deltas — Time delta 1 (430a) | | | Time delta 2 (430b) | | | Time delta 3 (430c) | |

SYSTEMS, METHODS, AND DATA STRUCTURES FOR SERIAL DATA COLLECTION AND COMPRESSION

CROSS-REFERENCE TO RELATED APPLICATIONS

This application is a National Stage of International Application No. PCT/US2020/044642, filed Jul. 31, 2020, claiming priority from U.S. Provisional Application No. 62/881,748, filed on Aug. 1, 2019, the disclosure of which is incorporated herein by reference in its entirety.

FIELD

This disclosure relates to collection and compression of electronic messages. More specifically, the disclosure relates to collection and compression of electronic messages in support of monitoring and protecting operational technology from cyberattacks.

BACKGROUND

Today, critical infrastructures that provide necessary functions and services depend heavily on operational technology (OT) systems to carry out their operations. Such OT systems are ubiquitous in industrial, military, and other government organizations. But with OT comes vulnerabilities. Those vulnerabilities expose a wide variety platforms and vehicles to security risks. For example, rail, aviation, and military vehicles, weapons platforms, maritime and shipping platforms, and construction and mining equipment, all can be exposed to security risks, such as cyberattacks, through OT vulnerabilities.

There is an urgent need to protect critical infrastructure from cyberattacks. The U.S. Government Accounting Office (GAO) reported that it "continues to designate information security as a government-wide high risk area due to increasing cyber-based threats and the persistent nature of security vulnerabilities." See, *GAO, High-Risk Series: Urgent Actions Are Needed to Address Cybersecurity Challenges Facing the Nation, Highlights*, GAO-18-465T (Washington, D.C.: June 2018).

Depending on engineering requirements, operational technology (OT) will incorporate devices that communicate with each other on a data bus using a mutually agreed upon protocol. Often the OT will employ serial data bus protocols, including, but not limited to:

ARINC 429, used on most high-end commercial and transport aircraft

CAN, originally designed for automobiles but used in a wide range of OT

J1939, which is a standard that sits atop CAN and is commonly used in heavy equipment RS-485, which underpins a wide range of OT, including industrial control systems MIL STD 1553, which is used widely in military platforms Analyzing the messages traveling on the data bus can give insight into unusual and possibly suspicious activity. However, the number of message traveling on the data bus can be enormous, making it difficult to collect and store the messages for later analysis. On a typical OT platform, hundreds of serial data messages traverse the data bus during a given second. Depending on the protocol, these data messages are typically small (less than 200 bits). The messages contain everything from requests to status updates to commands.

Serial data bus protocols generally entail messages with two components: some metadata (such as a message identification number) and the message's payload or data. Depending on the protocol, the format of these components may be well specified (as in J1939) or entirely proprietary (as in CAN).

An OT platform typically has dozens of electronic transceivers on its data bus. In most OT platforms, for engineering reasons—size, weight, power—and economic reasons, the hardware that is connected to the data bus has extremely limited compute and storage capacity and capabilities. Accordingly, the resources available to collect and store the messages are limited.

It is a technical problem to store every message traversing a serial data bus for long periods of time (as in months or years) and send them over potentially low-bandwidth communication channels (like spotty network connections) for later analysis. General purpose, lossless data compression methods such as the Lempel-Ziv family of compression methods or run-length encoding are simply too computation and memory intensive to work on the constrained hardware of many OT environments.

Because of the message volume and limited computing resources in many OT environments, there is a need to efficiently collect messages traveling on the OT data bus, compress them in a lossless manner, and store the compressed messages, in such a compute- and storage-constrained environment.

SUMMARY

Some embodiments of the present disclosure solve the previously mentioned problems and other problems of the background art. However, not all embodiments of the present disclosure are required to solve those problems to practice the inventive techniques of the present application.

Some embodiments of the present disclosure enable a method of storing messages in a computer readable memory, including: receiving a message transmitted on a bus, the message comprising metadata and a payload, the metadata comprising a message identification (ID) indicating a type of the message; generating a timestamp corresponding to a time of the receipt of the message; and storing the message in the memory, the memory comprising a plurality of message group storage areas, each message group storage area corresponding to one of a plurality of message groups, each message group corresponding to a single type of message, and each message group storage area comprises a first data structure and a second data structure, wherein the storing the message comprises, determining one of the plurality of message group storage areas based on the message ID of the message; storing the metadata and the payload of the message in the first data structure of the determined message group storage area by inserting the timestamp and message payload into said first data structure in a timestamp sorted order; and storing the payload and the metadata of the message in the second data structure of the determined message group storage area by inserting the message payload and the timestamp into said second data structure in a payload sorted order.

Some embodiments of the present disclosure enable a binary format message data structure, recorded on a nontransitory computer readable medium, includes: a preamble; and a payload comprising message time field, a message identification (ID) field, a length field, and a data field, wherein the message time field is configured to hold a time value of a time when a message was received from a serial bus, the time value comprising a message time overflow value and a message time value, wherein the message ID field is configured to hold information identifying a message type for the message, wherein the message length field is configured to hold information indicating a length of data held in the data field.

Some embodiments of the present disclosure enable a message format data structure, recorded on a non-transitory computer readable medium, including: a message payload preamble; and a plurality of message group fields; wherein the message payload preamble comprises; a base timestamp indicating a time of receipt of an earliest received message among a plurality of received messages; and a number of message groups value indicating a quantity of message groups in the plurality of message groups fields, wherein each message group field in the plurality of message group fields, comprises: a message group preamble, comprising: a message ID common to all messages in the message group; a message group data length indicating a length of data for each message in the message group; and a message group layout value indicating a layout for each message in the data group; and a message group data field comprising: a message layout preamble indicating a number of message entries in the message group; and a plurality of message entries each corresponding to one of the plurality of received messages.

Some embodiments of the present disclosure enable a method of compressing a plurality of messages, the method comprising: for each of the plurality of messages determining a message group among a plurality of message groups, based on a type of the message, wherein a plurality of in-memory storage areas each corresponds to one of the plurality of messages groups and comprises a first data structure and a second data structure; for each of the plurality of messages, recording in the first data structure for the corresponding message group a time of receipt of the message in association with data contained in the message, the first data structure arranged according to time of receipt; for each of the plurality of messages, recording in a second data structure for the corresponding message group data contained in the message in association with a time of receipt of the message, the second data structure arranged according to the data; for each message group evaluating whether a number of messages in the first data structure and second data structure exceed a threshold; for each message group, selecting, based on the evaluation, a layout for storing the received messages in the message group; generating a compressed message storage record comprising a plurality of message group fields each corresponding to one of the message groups and each formatted with the layout selected for the message group.

BRIEF DESCRIPTION OF THE DRAWINGS

Further features, the nature, and various advantages of the disclosed subject matter will be more apparent from the following detailed description with reference to the accompanying drawings in which:

FIG. 3A illustrates an example embodiment of an SBF message format.

FIG. 3B illustrates an example embodiment of a preamble of the SBF message format shown in FIG. 3A.

FIG. 3C illustrates an example embodiment of a message payload of the SBF message format shown in FIG. 3A.

FIG. 4A illustrates an example embodiment of an SMF message format.

FIG. 4B illustrates an example embodiment of a payload preamble of the SMF message format shown in FIG. 4A.

FIG. 4E illustrates an example embodiment of an explicit layout for the message group data contained in the message group format shown in FIG. 4C.

FIG. 4F illustrates an example embodiment of a data-coalesced layout for the message group data contained in the message group format shown in FIG. 4C.

DETAILED DESCRIPTION

Figure 1:
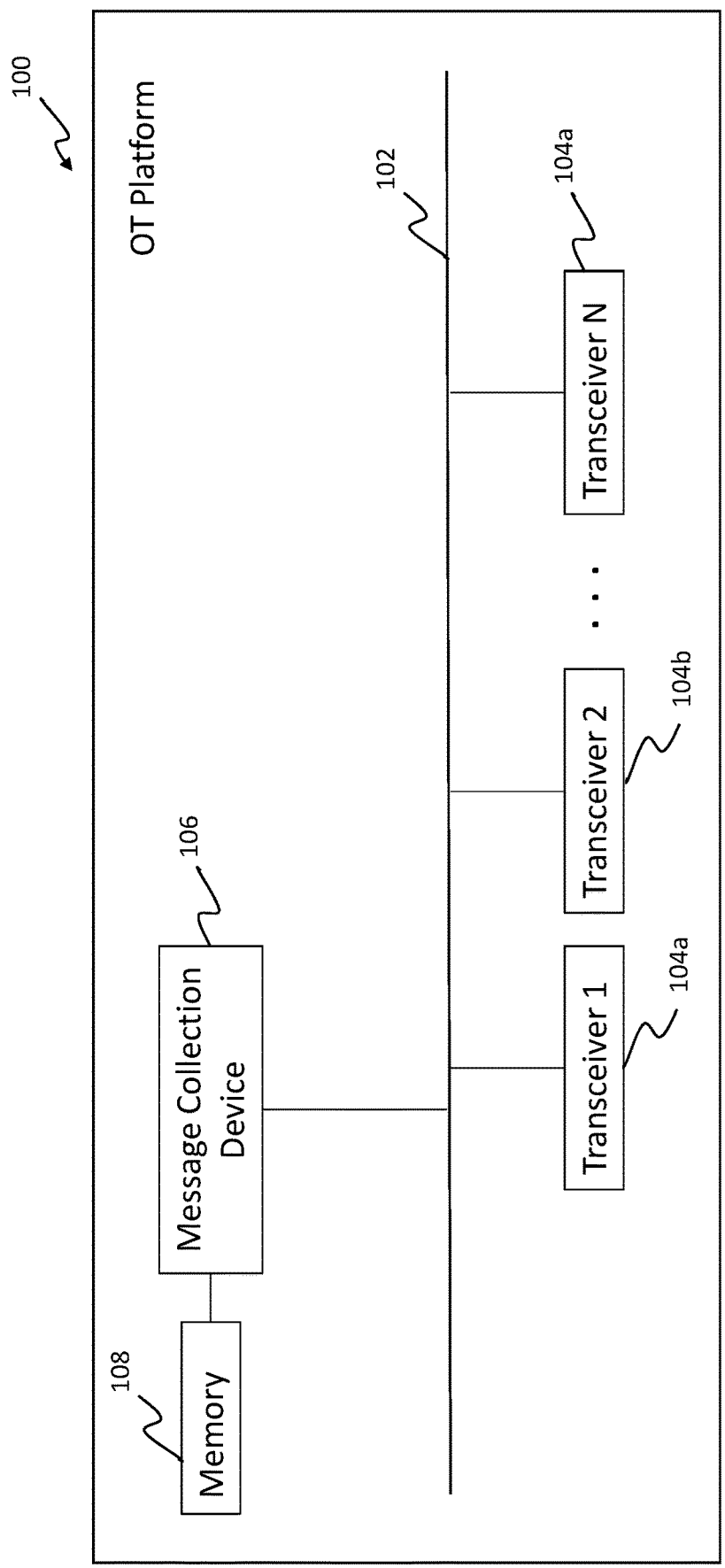
FIG. 1 illustrates an overview of an embodiment of a message collection and compression system deployed in an OT platform.

Illustrative embodiments of the invention will now be described in detail with reference to the attached drawings in which like reference numerals refer to like elements.

The message collection and storage techniques described here can be used in combination with other components that analyze the messages for use in defending against the entire lifecycle of a cyberattack—from initial access and exploitation to propagation and effect. By collecting every message traversing the data buses of an OT platform, attacks can be detected and prevented and incident response enabled.

This combination of components can take the form of a suite of cross-platform software libraries and programs that, when read from a memory and executed by one or more hardware processors, enables full collection of digital traffic traversing OT networks. This suite can run on a wide range of computing platforms and architectures, from microcontrollers to personal computers, for example. In most OT platforms, the hardware that is connected to the data bus has extremely limited compute and storage capacity. Accordingly, an embodiment of the message collection component is written using highly efficient, cross-platform code that works on both extremely limited and well-equipped computing platforms. The message compression and storage methods and data structures described here, enable feasible ways to efficiently and effectively collect, store, and transport in bulk the messages traveling on the data bus, for use by the suite of components.

System Overview

FIG. 1 illustrates an OT platform 100 in which an embodiment of the present disclosure operates. FIG. 1 illustrates components typically found in an OT platform, such as a serial data bus 102, a plurality of transceivers: transceiver 1 (104*a*), transceiver 2 (104*b*), through transceiver N (104*c*). Each of transceivers 1-N are connected and communicate over the serial bus 102. In additional to the typical components in an OT platform, the OT platform 100 also includes a message collection device 106 that is coupled to the serial bus 102. The message collection device 106 receives and collects every message transmitted on the bus. The message collection device 106 includes a processor capability which can be implemented by various types of hardware devices, such as a microcontroller for example. The message collection device 106 can include a computer readable memory for storing program instructions that are executed by the microcontroller or other processing device internal to the message collection device 106. The program instructions, when executed, cause message intake, collection, compression, and storage functions, as well as other functions, to be performed. A message storage memory 108 is coupled to the message collection device 106 and stores the messages processed by the message collection device 106.

Two types of novel, special purpose message formats can be used by the message collection device 106, a Serial Binary Format (SBF) message format and a Serial Message Format (SMF) message format.

The SBF message format is a novel, special purpose message format that has a simple layout requiring little computation complexity to generate. As such, it is well suited for live streaming messages from serial data busses found in OT environments.

The SMF message format is a novel, special purpose, lossless data compression scheme designed specifically for serial data bus messages. This special purpose nature permits far better computation and memory performance than the major general-purpose data compression algorithms but with similar data compression features. The SMF format facilitates storage of the collected messages and forwarding them for later processing and analysis.

The SMF message format is designed so that, as a collection device, such as the message collection device 106, receives messages from the serial data bus 102, it can parse and store those messages into highly efficient, in-memory data containers. The way these data containers are designed allows the message collection device 106 to produce an SMF file with highly desirable compression characteristics.

When the message collection device 106 receives a message, it stores the message into an associative data structure with desirable performance characteristics. The messages are sorted by metadata such that inserting new messages into the data structure entails logarithmic insertion time complexity in the worst case.

Each message transmitted on the serial bus 102 has a message identification number. Since in practice only a small subset of possible message identification numbers are used for a given OT platform, coalescing messages in this structure greatly reduces memory overhead from storing redundant metadata.

Figure 2:
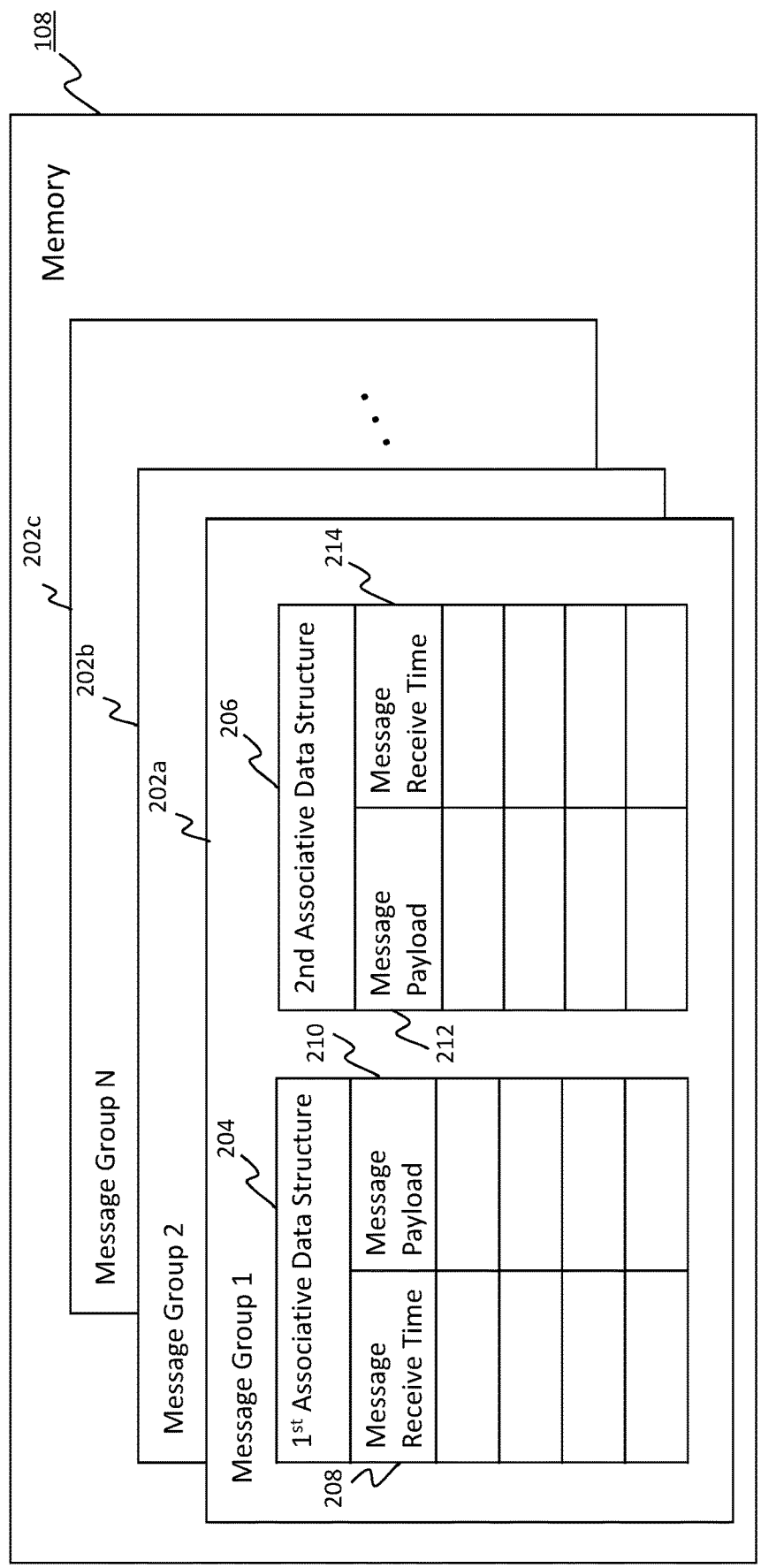
FIG. 2 illustrates an embodiment of a memory configuration with data structures for storing metadata and data of messages collected from a serial bus.

An embodiment of such an associative data structure is illustrated in FIG. 2. When the message collection device 106 receives messages from the serial bus 102, it inspects each message's identification number (ID) and groups the message into a message group based on the message ID.

FIG. 2 illustrates an embodiment of memory 108 in which the collected messages are stored. Memory 108 is logically arranged into a plurality of message groups, one for each message ID. FIG. 2 shows the memory configured to store collected messages in a plurality of memory groups: memory group 1 (202a), memory group 2 (202b), through memory group N (202c).

These message groups are themselves comprised of two associative data structures which store messages with identical metadata. For example, as shown in FIG. 2, message group 1 includes a first associative data structure 204 and a second associative data structure 206. The first associative data structure 204 maps the time at which a message was received to that message's payload. Accordingly, the first associative data structure 204 has a message receive time field 208 and a message payload field 210. The second associative data structure 206 stores the same data, but with the indices reversed: it maps the message's payload to the time at which it occurred. Accordingly, the second associative data structure 206 has a message payload field 212 and a message receive time field 214. Both of these data structures also entail logarithmic insertion time complexity in the number of collected messages in the worst case.

By storing these two associative containers within each message group, the message collection device 106 stores messages by coalescing them first by metadata, then either by time or by payload. This permits the message collection device 106 to determine, for each metadata value, a distinct layout. These layouts can depend on the particular serial data bus protocol. For example, SMFv1, which targets CAN and J1939, supports two protocols: the explicit layout and the data-coalesced layout.

In the explicit layout, each message's data and timestamp are listed. The timestamps are expressed as offsets from a base timestamp to save space. In the data-coalesced layout, a particular data value is listed once followed by all the timestamp offsets wherein a message with the given data was received. After a certain amount of time has elapsed or a certain number of messages are received, message collection device 106 then evaluates, for each message group, which layout is more compact. Thanks to the nested associative data structure setup described earlier, these sizes can be determined analytically without actually generating any output. Likewise, message collection device 106 can write out the SMF message format corresponding to all the collected messages with linear time complexity in the number of messages.

Through the careful use of associative data structures, the SMF message format allows message collection device to ingest newly collected messages with highly efficient time and memory complexity. Because its design dovetails with the associative data structure design, the SMF message format can be produced by the message collection device in linear time complexity. In practice, this novel data compression method yields comparably sized output to general-purpose data compression methods but with far less memory and computational overhead Message Formats Binary Format The Serial Binary Format (SBF) is a simple layout for recording message data in a streaming fashion. It is well suited for microcontrollers for which the SMF message format involves too much overhead. As such, the SBF format facilitates live streaming of the message data.

Examples of supported serial data bus message protocols include but are not limited to the following:
Controller Area Network
ARINC 429/ARINC 717
RS-232/RS-485

The file extension for SBF payloads is .sbf.

An embodiment of an SBF format 300 is shown in FIG. 3A. The SBF format includes an SBF preamble 302 and a message payload 304.

SBF Preamble

An embodiment of the SBF preamble 302 is shown in FIG. 3B. Each SBF message format begins with a preamble of 8 bytes made up of:
1. Watermark 306: Bytes 1 to 5 contain the watermark 65 7a 72 61 6a.
2. Endian type indicator 308: Byte 6 indicates whether the integer values in the payload are little endian (3c) or big endian (3e).
3. Version number 310: Bytes 7-8 indicate the version number.

The example preamble 302 shown in FIG. 3B is for a little-endian SBF of version 1.

SBF Messages

An embodiment of the SBF message payload 304 is shown in FIG. 3C.

Each SBF message format will record full information about the following data fields in a message:
1. Message Time Overflow 312: A four-byte unsigned integer indicating the message-time overflow, which is in 2^32 milliseconds.
2. Message Time 314: A four-byte unsigned integer indicating the message-time in microseconds. You obtain the message time by adding this value to the overflow (shifted 32 bits).
3. Message ID 316: A four-byte message identification number (ID).
4. Data Length 318: A one-byte data length.
5. Data Contents 320: The data contents, which has length equal to the data length given in the previous fields.

For example, in the SFB message payload 304 shown in FIG. 3C, the payload preamble corresponds to 0x0102030405 microseconds since the beginning of collection, a Message ID of 42, a data length of 4, and a payload of 01 02 03 04.

SMF Message Format

The Serial Message Format (SMF) is a layout for bulk storage and transmission of serial data bus messages. It is designed with the following environment in mind:
  it can run on resource-constrained hardware where traditional compression algorithms are too expensive.
  it will operate on a high message throughput.
  latency is acceptable but must be tunable.

Examples of supported serial data bus message protocols include but are not limited to the following:
  Controller Area Network
  ARINC 429/ARINC 717
  RS-232/RS-485

The file extension for SMF payloads is .smf.

Messages

SMF will record full information about the following data fields in a message:
1. Time with microsecond resolution.
2. Message identification number (ID).
3. Data length.
4. Data contents.

Batching and SMF Payloads

To produce an SMF payload, some number of messages are collected into a batch, grouping them by their message ID. All messages with the same message ID form a message group. The SMF protocol assumes that all messages in a message group have the same data length. An SMF payload representing a batch will begin with a 20-byte preamble, which contains important information for parsing the payload. Following the preamble is an array of message groups.

FIG. 4A illustrates an example of a SMF format 400, which includes an SMF payload preamble 402, and array of message groups: message group 1 (404a), message group 2 (404b) through message group N (404n).

Message Groups

Each message group contains an 7-byte preamble which indicates the group's message ID, the data length, and the number of messages in the group. It also indicates the group's SMF layout type. There are two SMF layout types: explicit and data-coalesced. Depending on the variability of a message group's data contents, laying the messages out one way or the other can result in substantial space savings. Since it is possible to compute the space taken by both layout types deterministically, you can choose the appropriate layout type for each message group individually. If a message group has an explicit layout, it lists a time/data value pair for each message. The explicit layout is appropriate for groups with high variation in data contents. If a message group has a data coalesced layout, it further groups the message group into messages with the same data contents. All messages in such a subdivision differ only by their timestamp. Accordingly, the data-coalesced layout simply lists the timestamps at which this message occurs. The data-coalesced layout is therefore appropriate for message groups with low variation in data contents.

Implementation: The SMF Payload Preamble

Note: While both big- and little-endian formats are supported by SMF, for simplicity all values in this document have little-endian byte order. All hexadecimal values begin with the prefix 0x.

An embodiment of an SMF payload preamble 402 is illustrated in FIG. 4B. The payload preamble is 20 bytes and includes:
1. Watermark 406: Bytes 1 to 5 contain the watermark 6c 6f 73 70 69.
2. Endian type 408: Byte 6 indicates whether the integer values in the payload are little endian (3c) or big endian (3e).
3. Version number 410: Bytes 7-8 indicate the version number. This 2-byte unsigned integer has endianness indicated by Byte 6, so a little-endian SMF will have bytes 00 01 while a big-endian SMF will have bytes 01 00.
4. Base Timestamp 412: Bytes 9 to 16 contain the timestamp of the earliest message in the payload. The timestamp's unit of measure is nanoseconds since the Unix epoch Jan. 1, 1970 at 00:00:00. This is called the base time.
5. No. of message groups 414: Bytes 17 to 20 contains the number of message groups in the payload.

In the example shown in FIG. 4B, the payload preamble corresponds to 1,555,775,413,037,000,000 nanoseconds since Unix epoch for the earliest message and 24 message groups.

Implementation: The Message Group

Figures 4C, 4D:
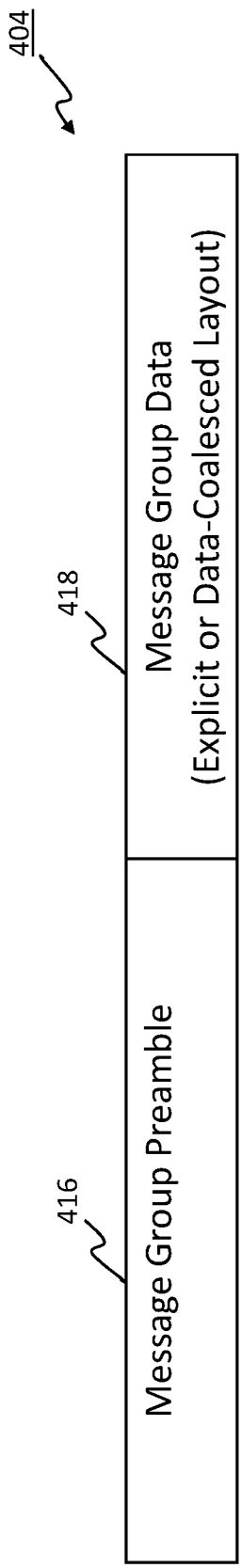
FIG. 4C illustrates an example embodiment of a message group format for the message groups contained in the SMF message format shown in FIG. 4A.
FIG. 4D illustrates an example embodiment of a message group preamble of the message group format shown in FIG. 4C.

Immediately following the SMF payload preamble 402 is the array of message groups 404a-n. Referring to FIG. 4C, each message group 404 begins with a message group preamble 416, followed by message group data 418. The 7-byte message group preamble 416 includes:
1. Message ID 420: Bytes 1-4 contain the message ID (recall these are the same within a message group)
2. Message data length 422: Bytes 5-6 contain the message data length (recall these are the same within a message group)
3. Layout type 424: Byte 7 contains the layout type: 0 for explicit and 1 for data-coalesced For example, the message group preamble 416 shown in FIG. 4D corresponds to a message group with message ID 0x39, message data length 0x04, and an explicit layout:

Implementation: Explicit Layouts

Each SMF explicit layout 418a, shown in FIG. 4E, begins with a 4-byte preamble which indicates the number of entries that follow, e.g., entry 1 and entry 2.

An example of an SMF explicit layout 418a is illustrated in FIG. 4E, and contains:

1. Preamble/No. of Entries 420: Bytes 1-4 contain the number of entries in the layout. Each entry has a length X equal to four plus the message group's data length (recall the data length is given in the message group preamble):
2. Timestamp Delta 422a/422b: Bytes 1-4 of each entry contains the timestamp delta, which equals the corresponding message's time minus the base time.
3. Data Contents 424a/424b: Bytes 5-(5+X) of each entry contain the corresponding message's data contents.

For example, using the previous message group preamble, the explicit layout 418a, shown in FIG. 4E, contains two messages, Entry 1 and Entry 2.

The first message, Entry 1, has a time delta 0x2ac1 with contents 0x0000001b. The second message, Entry 2, has a time delta 0x679e with contents 0x0405062a.

The number of entries given in the explicit layout preamble implies the end of an explicit layout.

Implementation: Data-Coalesced

Each data-coalesced layout 418b, shown in FIG. 4F, begins with a preamble of length 4 plus X, where X is the length of the message group's data length.

An example of an SMF data-coalesced layout 418b is illustrated in FIG. 4F, and contains:

1. Number of Data Groups/Entries 426: Bytes 1-4 contain the number of data groups within the layout.
2. Data Contents 428: Bytes 5-(5+X) contain the data contents corresponding to the data group.

Immediately following the preamble is a listing of time deltas 430a, 430b, and 430c, one for each message in the data group.

Suppose a message group preamble 420 specified a message ID of 0x60, a data length of 0x04, and a data-coalesced layout. Using this message group specification, the data-coalesced layout shown in FIG. 4F contains three messages.

Message 1 has a time delta 0x01cb, Message 2 has a time delta 0x0100aa, and Message 3 has a time delta 0x0a0b0c0d. All three messages have data contents 0x03000201.

As with explicit layouts, the number of entries given in the data-coalesced layout preamble implies the end of an explicit layout.

Generating an SMF Message Formats

Figure 5:
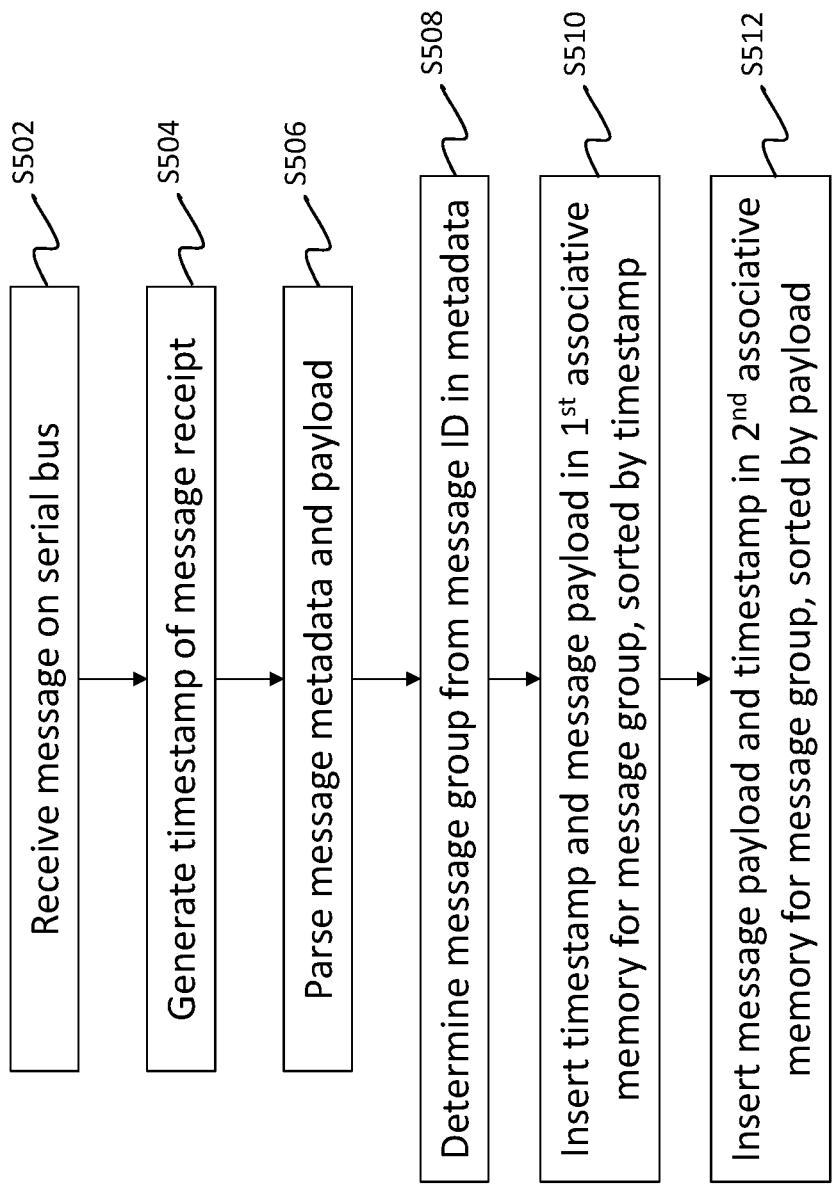
FIG. 5 is a flowchart illustrating an exemplary embodiment of a method for generating an SMF message format.

FIG. 5 is a flowchart illustrating an exemplary embodiment of method for generating an SMF message format for storing messages collected from a serial data bus. As shown in FIG. 5, the message collection device 106 monitors the serial bus 102 and receives messages that appear on the bus. S502. Upon receiving a message, the message collection device 106 generates a timestamp indicating the time the message is received. S504. The message's metadata and payload are parsed and the metadata inspected. S506. The message's metadata contains a message ID. Upon parsing the metadata, the message's ID is determined and a message group, corresponding to the message ID, is determined. S508.

The memory 108 is organized to store data by message group. As shown in FIG. 2, the memory can store data for a plurality of message groups, e.g., message groups 1-N (202a-202c), in which each message group has first and second associative data structures. For example, memory group 1 in FIG. 2 has a first associative data structure 204 in which it holds message data sorted by time of message receipt. A second associative data structure 206 of memory group 1 holds the same message data, although that data is sorted by message payload.

After determining the message ID for the received message, the message collection device 106 inserts the timestamp and message payload for the message into the first data structure 204 in a manner that maintains the timestamp organization of the first associative data structure. S510. The message collection device 106 also inserts the timestamp and message payload for the received message into the second data structure 206 in a manner that maintains the payload organization of the second associative data structure. S512. By inserting the message data into the first and second associative data structures in a manner that maintains the data organization of each data structure, respectively, the message collection device 106 can quickly and efficiently, with a small amount of computing complexity, evaluate the messages stored in the memory for each message group.

Figure 6:
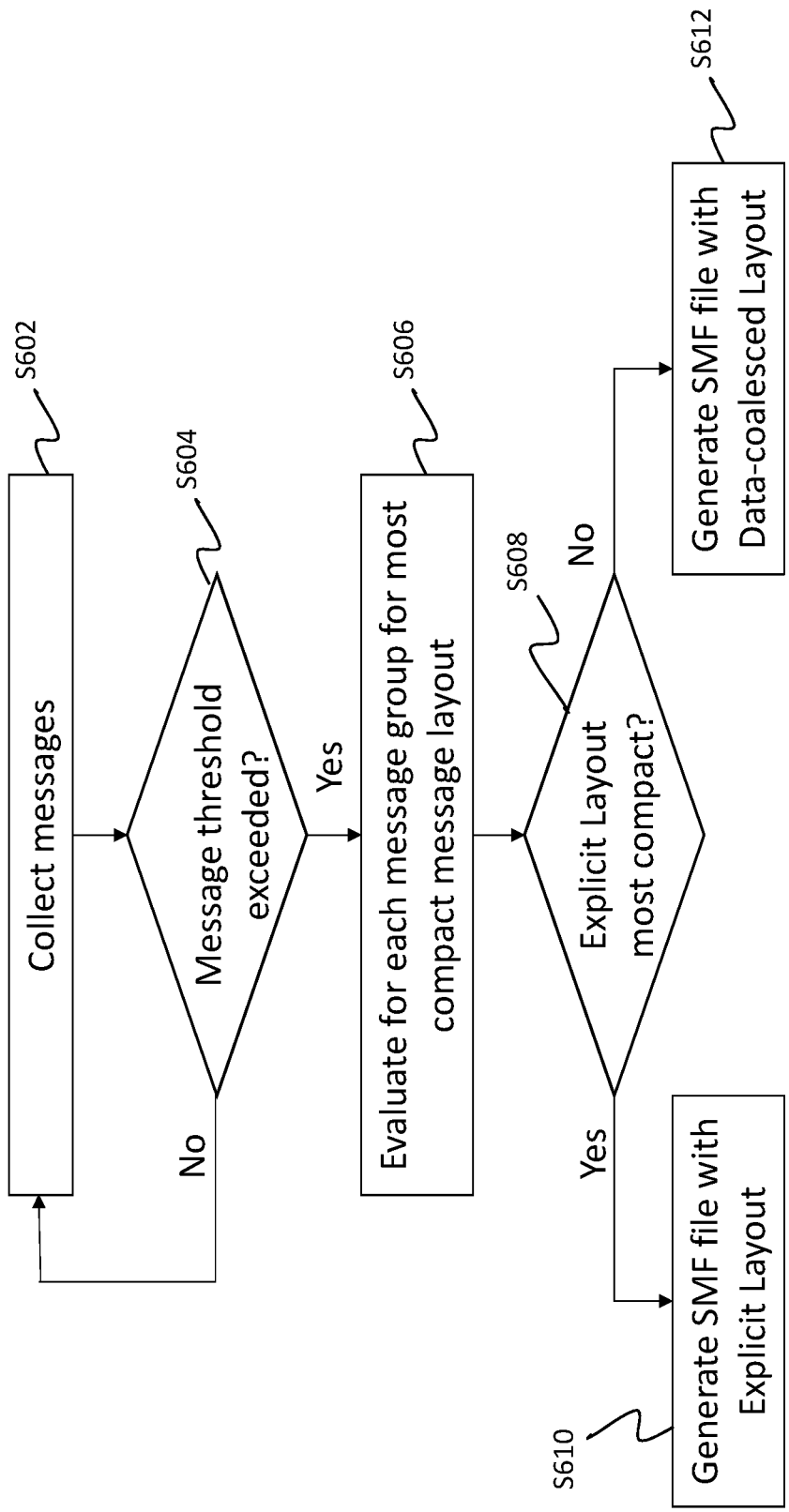
FIG. 6 is a flowchart illustrating an exemplary embodiment of a method for determining an SMF layout to use for generating an SMF file.

Referring to FIG. 6, once the message collection device 106 collects messages from the serial bus (S602), it determines if either a certain amount of time has elapsed or if a certain number of messages have been collected. S604. If a threshold for either of those criteria is not exceeded, the process returns to collecting more messages in S602. On the other hand, if a threshold for either of those criteria is exceeded, the process continues to step S606 towards generating an SMF file.

If the collected messages exceed such a threshold, the data structures for each message group are evaluated to determine a layout that will produce the most compact layout for the message group. S606. For example, the evaluation might determine that the messages collected for a one message group have a high degree of variation in data content, and that for another message group many of the messages collected have a low degree of variation in data content or have the same data content. The evaluation can include determine a size of different layouts and then compare those sizes. Because of the nested associative data structure setup described earlier, the sizes of the candidate layouts can be determined analytically without actually generating any output.

Based on the evaluation it is determined which layout is the most compact for each message group. S608. The embodiment shown in FIG. 6 determines if the explicit layout results in the most compact layout. Other embodiments can determine if the data-coalesced layout results in the mort compact layer.

If the explicit layout is evaluated to result in the more compact sized layout for a message group, the message collection device 106 writes the messages out of the appropriate associative data structure for that message group into an SMF explicit layout form. S610. If the explicit layout is evaluated not to result in the more compact sized layout for a message group, the message collection device 106 writes the messages out of the appropriate associative data structure for that message group into an SMF data-coalesced layout form. S612. Because the message data is held in one of the associative data structures in a time based organization and held in the other associative data structure in a data content based organization, the message formats can be written out with linear time complexity with respect to the number of messages being written out. This results in data compression and storage methods that yield comparably sized outputs to general-purpose data compression methods, but with far less memory and computational overhead.

Message Collection Device Structure

Figure 7:
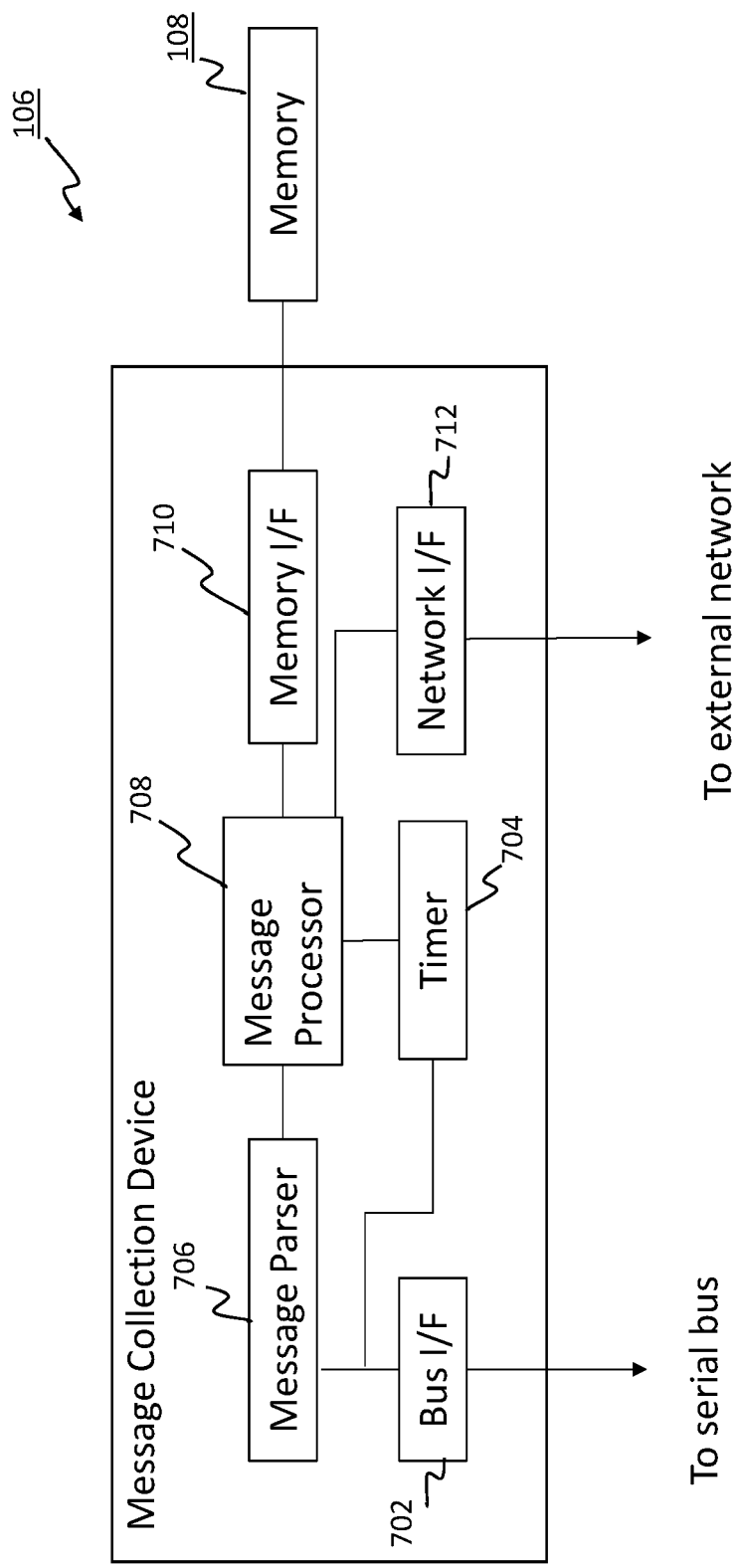
FIG. 7 is a diagram illustrating components of example embodiment of a message collection device.

An example embodiment of the message collection device 106 shown in FIG. 1, is illustrated in more detail in FIG. 7. Exemplary embodiments of the message collection device can include the components illustrated in FIG. 7, but are not limited to those components. In this embodiment, a bus interface 702 connects to serial bus to receive messages. The bus interface 702 is connected to a message parser 706 and a timer 704. The message parser 706 receives messages from the bus interface 702 and parses the metadata and the payload of the received messages and passes the parsed information to a message processor 708. The timer 704 is notified by the bus interface 702 when a message is received and generates a timestamp that indicates the message receive time. The timer 704 is connected to the message processor 708 and sends the timestamp to the message processor. The message processor 708 is coupled to memory 108 by way of a memory interface 710. Based on the metadata received from the message parser 706 and the timestamp from the timer 704, the message processor 708 determines the message group for a message and controls the operations of inserting the timestamp and message payload into the associative data structures in memory 108. The message processor 708 also controls the operations related to generating the various SMF files, as shown in FIG. 6.

The embodiment of the message collection device 106 shown in FIG. 7 includes a network interface 712 which is connected to the message processor 708 and connected to an external network, such as a wide area network. Although not required in all embodiments, the network interface 712 can allow for interactions with devices not connected to the serial bus of the OT. For example, the network interface 712 can connect over the external network to a remote terminal or a remote server to send the SMF files the message collection device 106 generates. The remote terminal or remote server can process and analyze the message data in the SMF files to, for example, detect anomalies in the message traffic which might indicate nefarious or otherwise suspicious cyber activity in the OT.

The message collection device 106 is not limited to the embodiment shown in FIG. 7, as it will be understood that other configurations can be used to perform the operations and functions described herein.

Hardware/Software Environment

Figure 8:
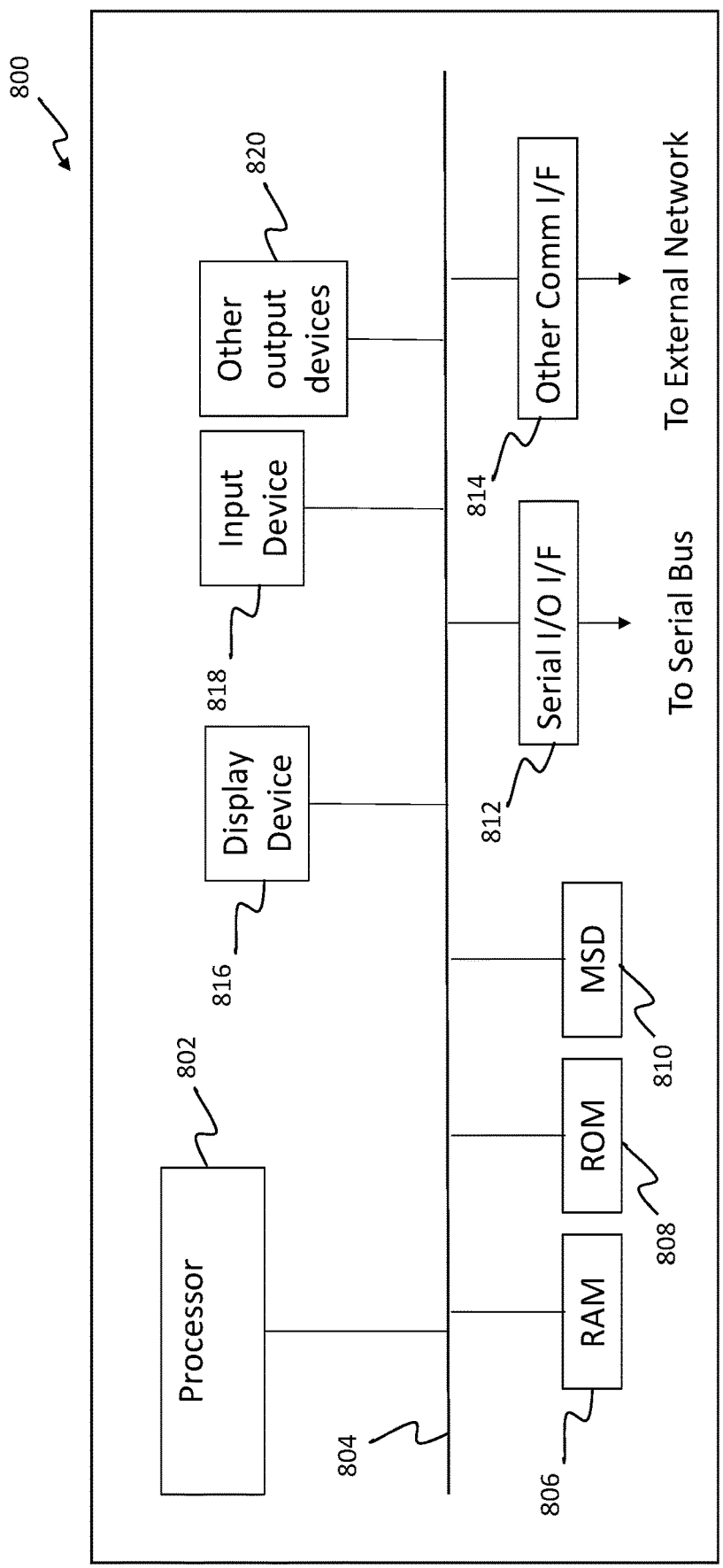
FIG. 8 is a diagram illustrating a hardware configuration of an information processing system that can be used to implement various devices of at least some embodiments of the invention.

A hardware configuration of an information processing system 800 according to one exemplary embodiment is shown in FIG. 8. This embodiment can be used to implement, for example, the message collection device 106, the message processor 708, and other computer implemented structures disclosed herein. While the information processing system 800 shown in FIG. 8 illustrates various components, not all components are necessary to use in various embodiments of the computing structures described herein.

FIG. 8 is a block diagram illustrating a hardware configuration of an information processing system 800 according to an example embodiment. The message collection device 106 can be structured, in certain embodiments, with one or more of the components of the information processing system 800 shown in FIG. 8. The message processor 708 also can be structured, in certain embodiments, with one or more of the components of the information processing system 800. Other devices that can be implemented with the structures in the information processing system 800 can include transceivers 1-N, shown in FIG. 1, and remote terminals, computers, servers, or other computing device that communicate with the message collection device 106 via an external network. Further, the information processing system 800 has a function of a computer. For example, the information processing system 800 may be configured integrally within an embedded controller, and in other embodiments it may be configured with a general purpose computer such as a personal computer (PC), a laptop PC, a tablet PC, a smartphone, or the like.

The information processing system 800 has a processor 802, a random access memory (RAM) 806, a read only memory (ROM) 808, and a possibly a mass storage device (MSD) 810 such as a hard disk drive (HDD), an optical disk drive, an electrically erasable ROM (EEROM) or other semiconductor memory, or another known device for persistently storing large quantities of data in order to perform storage and retrieval of electronic data. Further, the information processing system 800 can include a serial input/output (I/O) interface (UF) 812 for connection to a serial bus. In certain embodiments the information processing system 800 can include communication interfaces 814 for communications protocols other than serial data communication. In certain embodiments the information processing system 800 can include a display device 816, an input device 818, and other output devices 820. The processor 802, the RAM 806, the ROM 808, the MSD 810, the serial I/O communication I/F 814, the other communication interfaces 814, the display device 816, the input device 818, and the other output devices 820 are connected to each other via a bus 804. According to an example embodiment, the display device 816, the input device 818, the other output devices 820 may be connected to the bus 804 via a drive device (not illustrated) used for driving these devices. According to an example embodiment, the processor 802 may be a central processing unit (CPU), a microcontroller, other types of controllers, or the like. Moreover, in some embodiments the processor 802 may be comprised of one or more processors, such as a plurality of CPUs or microcontrollers. According to another example embodiment, the processor 802 may be a hardware processor. According to another example embodiment, the processor 802 may be implemented by a combination of hardware, software, and/or firmware components. According to another example embodiment, the processor 802 may be implemented by a configuration of electronic components including one or more circuitry components.

While respective components forming the information processing system 800 are illustrated in FIG. 8 as an integrated device, some of the components and/or some of the functions performed by the components thereof may be performed by an externally attached device. For example, the display device 816, the input device 818, and the other output devices 820 may be externally attached devices that are separate from apart from the components performing the functions of a computer including the processor 802 or the like.

The processor 802 has a function of performing an operation in accordance with a program stored in the ROM 808, the MSD 810, or the like, and controlling each component of the information processing system 800. According to an example embodiment, the processor 802 may obtain one or more instructions stored in the ROM 808, the MSD 810, or the like and execute the one or more instructions to perform one or more operations. The one or more operations may include controlling one or more components of the information processing system 800 to perform one or more operations. The RAM 806 is formed of a volatile storage medium and provides a temporary memory field used in the operation of the processor 802. The ROM 808 is formed of a nonvolatile storage medium and stores information such as a program used in the operation of the information processing system 800. The MSD 810 is a storage device that is formed of a nonvolatile storage medium and stores electronic data, such as message captured by the message collection device 106, or the like.

The other communication I/F 814 may be a communication interface based on a specification such as an 802.11 wireless communication standard, a 3GPP standard for cellular communication, or the like, which is a module for communicating with other devices. The display device 816 may be a liquid crystal display, an organic light emitting diode (OLED) display, or any other computer controlled device capable of displaying a moving image, a static image, a text, or the like. Examples of the input device 818 are a button, a touchscreen, a keyboard, a pointing device, or the like and capable of use by a user to operate the information processing system 800. The display device 816 and the input device 818 may be integrally formed such as in a touchscreen.

According to an example embodiment, the hardware configuration illustrated in FIG. 8 is an example, and a components or devices, other than those illustrated in FIG. 8, may be added, or some of the components or devices may not be provided. Further, some of the components or devices may be replaced with another component or device having a similar function. Furthermore, some of the functions may be provided by another component or device via a network, or the functions forming the example embodiment may be implemented by being distributed in a plurality of components or devices. For example, the MSD 810 may be replaced with cloud storage.

While the subject matter of the present application has been particularly shown and described with reference to illustrative embodiments thereof, it will be understood by those of ordinary skill in the art that various changes in form and details may be made therein without departing from the spirit and scope of the invention as defined by the appended claims. The illustrative embodiments should be considered in a descriptive sense only and not for purposes of limitation.

While the various embodiments described herein may contain different components and features, upon reading the specification, one skilled in the art readily will realize that such components and features in one embodiment may be incorporated into or combined with components and features of another embodiment. Also, the description of various embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents thereof.

The whole or part of the example embodiments disclosed above can be described as, but not limited to, the following supplementary notes.

[Supplemental Note 1]
A method of storing messages in a computer readable memory, comprising:
 receiving a message transmitted on a bus, the message comprising metadata and a payload, the metadata comprising a message identification (ID) indicating a type of the message;
 generating a timestamp corresponding to a time of the receipt of the message; and
 storing the message in the memory, the memory comprising a plurality of message group storage areas, each message group storage area corresponding to one of a plurality of message groups, each message group corresponding to a single type of message, and each message group storage area comprises a first data structure and a second data structure, wherein the storing the message comprises,
 determining one of the plurality of message group storage areas based on the message ID of the message;
 storing the metadata and the payload of the message in the first data structure of the determined message group storage area by inserting the timestamp and message payload into said first data structure in a timestamp sorted order; and
 storing the payload and the metadata of the message in the second data structure of the determined message group storage area by inserting the message payload and the timestamp into said second data structure in a payload sorted order.

[Supplemental Note 2]
The method of SUPPLEMENTAL NOTE 1 wherein the bus is a serial bus.

[Supplemental Note 3]
The method of SUPPLEMENTAL NOTES 1 or 2, wherein
 the first data structure and second data structure are associative data structures.

[Supplemental Note 4]
The method of any one of SUPPLEMENTAL NOTES 1, 2 or 3, wherein
 the insertion of the timestamp and message payload into at least one of said first data structure and said second data structure is performed with logarithmic insertion time complexity.

[Supplemental Note 5]
A binary format message data structure, recorded on a non-transitory computer readable medium, comprising:
 a preamble; and
 a payload comprising message time field, a message identification (ID) field, a length field, and a data field,
 wherein the message time field is configured to hold a time value of a time when a message was received from a serial bus, the time value comprising a message time overflow value and a message time value,
 wherein the message ID field is configured to hold information identifying a message type for the message,
 wherein the message length field is configured to hold information indicating a length of data held in the data field.

[Supplemental Note 6]
The data structure of SUPPLEMENTAL NOTE 5, wherein
 the binary format message data structure is configured to store the message with lossless data compression.

[Supplemental Note 7]
A message format data structure, recorded on a non-transitory computer readable medium, comprising:
 a message payload preamble; and
 a plurality of message group fields;
 wherein the message payload preamble comprises;
 an base timestamp indicating a time of receipt of an earliest received message among a plurality of received messages; and a number of message groups value indicating a quantity of message groups in the plurality of message groups fields, wherein each message group field in the plurality of message group fields, comprises:

a message group preamble, comprising:

a message ID common to all messages in the message group;

a message group data length indicating a length of data for each message in the message group; and a message group layout value indicating a layout for each message in the data group; and a message group data field comprising:

a message layout preamble indicating a number of message entries in the message group; and a plurality of message entries each corresponding to one of the plurality of received messages.

[Supplemental Note 8]

The message format data structure of SUPPLEMENTAL NOTE 7, wherein the message group layout value indicates an explicit layout, and each of the plurality of message entries corresponds to one of the plurality of received messages and comprises:

time information corresponding to the time of receipt of the message; and message data contained within the message.

[Supplemental Note 9]

The message format data structure of SUPPLEMENTAL NOTES 7 or 8, wherein the message group layout value indicates a data-coalesced layout, the message layout preamble further comprises a message data field containing data common to each of the plurality of received messages for the message group, and each of the plurality of message entries comprises time information corresponding to the time of receipt of the corresponding message.

[Supplemental Note 10]

The message format data structure of any one of SUPPLEMENTAL NOTES 7, 8, or 9, wherein the plurality of received messages are messages transmitted on a serial bus.

[Supplemental Note 11]

A method of compressing a plurality of messages, the method comprising:

for each of the plurality of messages determining a message group among a plurality of message groups, based on a type of the message, wherein a plurality of in-memory storage areas each corresponds to one of the plurality of messages groups and comprises a first data structure and a second data structure;

for each of the plurality of messages, recording in the first data structure for the corresponding message group a time of receipt of the message in association with data contained in the message, the first data structure arranged according to time of receipt;

for each of the plurality of messages, recording in a second data structure for the corresponding message group data contained in the message in association with a time of receipt of the message, the second data structure arranged according to the data;

for each message group evaluating whether a number of messages in the first data structure and second data structure exceed a threshold;

for each message group, selecting, based on the evaluation, a layout for storing the received messages in the message group;

generating a compressed message storage record comprising a plurality of message group fields each corresponding to one of the message groups and each formatted with the layout selected for the message group.

[Supplemental Note 12]

The method of SUPPLEMENTAL NOTE 11, wherein a first layout is selected if the evaluation indicates a large number of the messages in the message group have a high variation in data contents, wherein the first layout is an explicit layout that comprises a plurality of entries each entry comprising a time and data value pair for each message in the message group.

[Supplemental Note 13]

The method of SUPPLEMENTAL NOTE 11, wherein a second layout is selected if the evaluation indicates a large number of the messages in the message group have the same data contents, wherein the second layout is a data-coalesced layout that comprises a plurality of time entries for each message in the message group and a common data value for each message in the message group.

[Supplemental Note 14]

The method of any one of SUPPLEMENTAL NOTES 11-13, wherein the plurality of messages are received on a serial bus.

The foregoing disclosure provides illustration and description, but is not intended to be exhaustive or to limit the implementations to the forms explicitly described. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of embodiments of the present disclosure.

Even though combinations of features are recited in the claims and/or disclosed in the specification, these combinations are not intended to limit the disclosure of possible implementations. Many of the described features may be combined in ways not explicitly recited in the claims and/or explicitly described in the above disclosure. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the terms "has," "have," "having," "including" or the like are intended to be open-ended terms. Further, the phrase "based on" is intended to mean "based, at least in part, on" unless explicitly stated otherwise. The term "or" as used herein is an inclusive "or", and has a meaning equivalent to "and/or."

What is claimed is:

1. A method of compressing a plurality of messages, the method comprising:

for each of the plurality of messages, determining a message group among a plurality of message groups, based on a message identification number included in metadata of the message, wherein each of a plurality of in-memory storage areas corresponds to one of the plurality of message groups and comprises a first data structure and a second data structure;

for each of the plurality of messages, recording in the first data structure for the corresponding message group, a time of receipt of the message in association with data contained in the message, the first data structure arranged according to time of receipt;

for each of the plurality of messages, recording, in the second data structure for the corresponding message group data contained in the message in association with a time of receipt of the message, the second data structure arranged according to the data;

for each message group, when a number of messages in the first data structure and the second structure exceeds a prescribed threshold or when a prescribed amount of time has elapsed, evaluating a first layout of the first data structure and a second layout of the second data structure for determining which one of the first layout and the second layout is a more compact layout for the message group;

for each message group, selecting, based on the evaluation, the more compact layout for storing received messages in the message group; and generating a compressed message storage record comprising a plurality of message group fields each corresponding to one of the message groups and each formatted with the more compact layout selected for the message group.

2. The method of compressing a plurality of messages according to claim 1, wherein a first layout is selected if the evaluation indicates a large number of the messages in the message group have a high variation in data contents, wherein the first layout is an explicit layout that comprises a plurality of entries each entry comprising a time and data value pair for each message in the message group.

3. The method of compressing a plurality of messages according to claim 1, wherein a second layout is selected if the evaluation indicates a large number of the messages in the message group have the same data contents, wherein the second layout is a data-coalesced layout that comprises a plurality of time entries for each message in the message group and a common data value for each message in the message group.

4. The method of compressing a plurality of messages according to claim 1, wherein the plurality of messages are received on a serial bus.

5. The method of compressing a plurality of messages according to claim 1,
wherein each of at least a subset of the plurality of messages comprises a message payload preamble and the plurality of message group fields,
wherein the message payload preamble comprises a base timestamp indicating a time of receipt of an earliest received message among a plurality of received messages, and a number of message groups value indicating a quantity of message groups in the plurality of message group fields.

6. The method of compressing a plurality of messages according to claim 5,
wherein each message group field in the plurality of message group fields, comprises:
a message group preamble, comprising:
a message identifier common to all messages in a given message group;
a message group data length indicating a length of data for each message in the message group; and
a message group layout value indicating a layout for each message in a data group; and
a message group data field comprising:
a message layout preamble indicating a number of message entries in the message group; and
a plurality of message entries each corresponding to one of the plurality of received messages.

7. The method of compressing a plurality of messages according to claim 6, wherein
the message group layout value indicates a data-coalesced layout,
the message layout preamble further comprises a message data field containing data common to each of the plurality of received messages for the message group, and
each of the plurality of message entries comprises time information corresponding to a time of receipt of the corresponding message.

8. The method of compressing a plurality of messages according to claim 1, wherein in the layout selected for each message group, a timestamp and data for each message is listed, wherein the timestamp is expressed as an offset from a base timestamp.

* * * * *